United States Patent
Mori

(10) Patent No.: US 7,731,917 B2
(45) Date of Patent: Jun. 8, 2010

(54) HEAT EXCHANGE REACTOR

(75) Inventor: Yasuhiko Mori, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 622 days.

(21) Appl. No.: 11/569,561

(22) PCT Filed: May 27, 2005

(86) PCT No.: PCT/JP2005/010203

§ 371 (c)(1),
(2), (4) Date: Nov. 22, 2006

(87) PCT Pub. No.: WO2005/115608

PCT Pub. Date: Dec. 8, 2005

(65) Prior Publication Data

US 2007/0217991 A1    Sep. 20, 2007

(30) Foreign Application Priority Data

May 28, 2004 (JP) ............................. 2004-158829

(51) Int. Cl.
*B01J 8/04* (2006.01)
*F28D 7/00* (2006.01)
*F28D 21/00* (2006.01)

(52) U.S. Cl. ...................... 422/198; 422/196; 422/197; 422/201; 422/202; 422/205; 422/211; 165/81; 165/140; 165/159; 165/160; 165/161; 165/162; 423/502

(58) Field of Classification Search ................. 422/198, 422/196, 197, 201, 202, 205, 211; 423/502; 165/81, 140, 159, 160, 161, 162
See application file for complete search history.

(56) References Cited

U.S. PATENT DOCUMENTS 4,203,906 A    5/1980    Takada et al.

(Continued)

FOREIGN PATENT DOCUMENTS

EP    0 383 224 A2    8/1990

(Continued)

*Primary Examiner*—Walter D Griffin
*Assistant Examiner*—Huy-Tram Nguyen
(74) *Attorney, Agent, or Firm*—Sughrue Mion, PLLC

(57) ABSTRACT

The present invention provides a heat exchange reactor comprising a reaction tube for obtaining a product (B) by exothermic reaction while passing a starting compound (A) therethrough and a reactor shell covering the surrounding of the reaction tube and having its interior divided into a plurality of regions along the passing direction of the starting compound (A), each of which regions is filled with a heat medium for carrying out heat exchange between the inside of the reaction tube and the heat medium independently for the respective separate regions; wherein the reactor is provided with a heater for heating the heat medium charged in the most upstream region among the separate regions independently from the heat media charged in other regions.

6 Claims, 3 Drawing Sheets

U.S. PATENT DOCUMENTS

| | | | | |
|---|---|---|---|---|
| 4,256,783 | A * | 3/1981 | Takada et al. | 422/197 |
| 4,394,367 | A * | 7/1983 | Foster | 423/502 |
| 4,774,070 | A * | 9/1988 | Itoh et al. | 423/502 |
| 6,431,261 | B2 * | 8/2002 | Nishimura et al. | 165/81 |
| 6,994,833 | B1 | 2/2006 | Nishimura et al. | |
| 7,297,814 | B2 * | 11/2007 | Yada et al. | 562/532 |
| 2003/0006026 | A1 * | 1/2003 | Matsumoto et al. | 165/157 |
| 2004/0052718 | A1 * | 3/2004 | Walsdorff et al. | 423/502 |
| 2006/0099138 | A1 * | 5/2006 | Walsdorff et al. | 423/502 |

FOREIGN PATENT DOCUMENTS

| | | |
|---|---|---|
| FR | 2 256 778 A | 8/1975 |
| GB | 2 001 257 A | 1/1979 |
| JP | 54-21966 | 2/1979 |
| JP | 2000-229239 A | 8/2000 |
| JP | 2001-129384 A | 5/2001 |
| JP | 2002-292279 A | 10/2002 |
| JP | 2004-99388 A | 4/2004 |
| WO | 01/36088 A1 | 5/2001 |

* cited by examiner

Prior Art

HEAT EXCHANGE REACTOR

FIELD OF THE INVENTION

The present invention relates to a heat exchange reactor and a reaction method and a process for production using the same.

BACKGROUND ART

In general, exothermal reaction for obtaining a product (B) from a starting compound (A) is easy to abruptly generate heat if the reaction is carried out at a temperature exceeding a prescribed reaction temperature and therefore, it is required to carry out the reaction while efficiently removing heat. As a reactor for carrying out such reaction, a heat exchange reactor (1') which is provided with a reaction tube (2) and a reactor shell (3) covering the surrounding of the reaction tube (2) as shown in FIG. 3 has been widely used. With the reactor (1'), the product (B) is obtained by exothermal reaction while passing the starting compound (A) in the reaction tube (2). The reactor shell (3) is divided into a plurality of regions (31 to 34) along the passing direction of the starting compound (A) and each of the separate regions (31 to 34) is filled with a heat medium (C1 to C4) to carry out heat exchange between the inside of the reaction tube (2) and the respective heat media (C1 to C4) [reference to JP-A-2001-129384]. The heat exchange reactor (1') is capable of efficiently removing heat and keeping the temperature in the reaction tube (2) at a prescribed reaction temperature by changing the temperature of the respective heat media (C1 to C4) in accordance with the heat generation quantities of the respective regions (31 to 34).

DISCLOSURE OF THE INVENTION

However, with respect to such a conventional heat exchange reactor (1'), in the case starting compound (A) is supplied in small amount due to the relatively small reaction quantities in the respective regions (31 to 34) compared to the reaction quantity in the entire body, or in the case the catalyst activity becomes lower, the total of the brought out quantity of sensible heat in the respective regions (31 to 34) and the quantity of the heat discharge exceed the quantity of reaction heat to result in occurrence of a problem that the prescribed reaction temperature cannot be kept, particularly, in the most upstream region (31). In addition, in such cases, there is another problem that the reaction yield decreases.

A purpose of the present invention is to provide a heat exchange reactor capable of keeping the most upstream region at a prescribed reaction temperature even if the supply amount of the starting compound (A) is small, and another purpose is to provide a heat exchange reactor easy to keep the prescribed reaction temperature in the entire regions. Further, a purpose of the present invention is to provide a reaction method of the starting compound (A) capable of suppressing decrease of a reaction yield and a process for production of the product (B).

The present invention provides a heat exchange reactor comprising a reaction tube for obtaining a product (B) by exothermic reaction while passing a starting compound (A) therethrough and a reactor shell covering the surrounding of the reaction tube and having its interior divided into a plurality of regions along the passing direction of the starting compound (A), each of which regions is filled with a heat medium for carrying out heat exchange between the inside of the reaction tube and the heat medium independently for the respective separate regions; wherein the reactor is provided with a heater for heating the heat medium charged in the most upstream region among the separate regions independently from the heat media charged in other regions, or all of the separate regions are respectively provided with heaters for heating the respectively charged heat media independently from the heat media charged in other regions. The present invention also provides a reaction method of the starting compound (A) by supplying and passing the starting compound (A) to and through the reaction tube of the heat exchange reactor and carrying out exothermic reaction and further a process for producing chlorine by supplying and passing hydrochloric acid and oxygen to and through the reaction tube of the heat exchange reactor and carrying out exothermic reaction.

FIG. 1 and FIG. 2 respectively show a schematic drawing of one embodiment of the heat exchange reactors of the present invention.

EFFECT OF THE INVENTION

According to the present invention, a heat exchange reactor is provided which is capable of keeping the most upstream region at a prescribed reaction temperature even if the supply amount of a starting compound (A) is small. Further, the present invention provides a heat exchange reactor which is easy to keep the entire regions at prescribed reaction temperature. Further, the present invention provides a reaction method of a starting compound (A) capable of suppressing decrease of the reaction yield and a process for production of a product (B).

Figure 1:
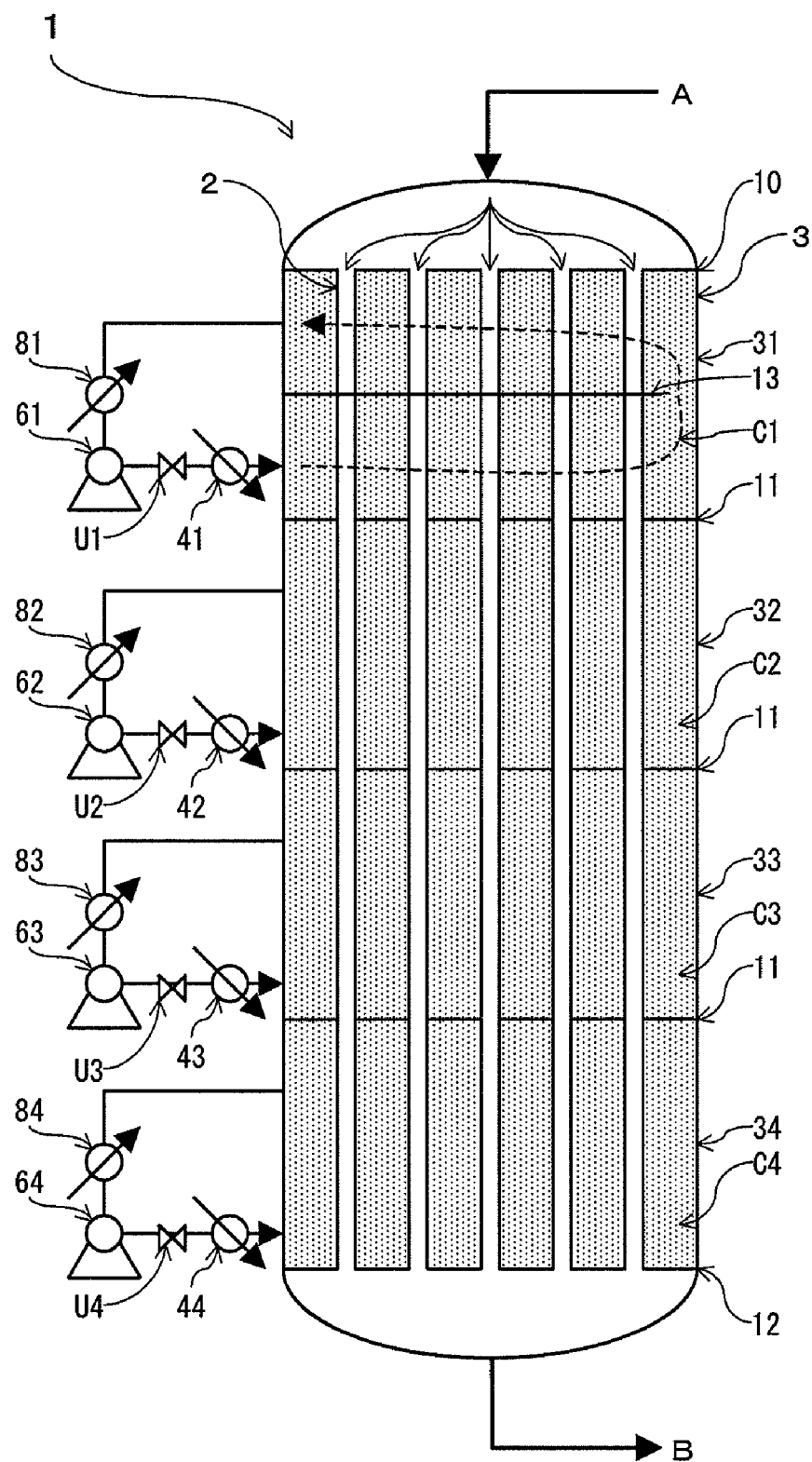
FIG. 1 is a schematic illustration showing one embodiment of a heat exchange reactor of the present invention.

1: a heat exchange reactor of the present invention
1': a heat exchange reactor of the prior art
2: a reaction tube
3: a reactor shell
31 to 34: separate regions
41 to 44: heaters
51 to 54: circulation tanks
61 to 64: circulation pumps
8, 81 to 84: cooling apparatuses
9: a preheating apparatus
10: an upper tubular plate
11: partitions (shutting plates, intermediate tubular plates)
12: a lower tubular plate
13: baffle plates
U1 to U4: circulation flow rate control valves
V1 to V4: supply flow rate control valves
A: a starting compound
B: a product
C0 to C4: heat media

DESCRIPTION OF THE PREFERRED EMBODIMENTS

A starting compound (A) applicable for a heat exchange reactor (1) of the present invention is a compound to be a product (B) by exothermic reaction and are generally gaseous compounds. Practically, examples thereof include hydrochloric acid (HCl) and oxygen ($O_2$) for obtaining chlorine ($Cl_2$) by vapor phase oxidation method, propylene and oxygen ($O_2$) for obtaining acrolein or further acrylic acid as the product (B) by vapor phase oxidation method, and isobutylene and oxygen ($O_2$) for obtaining methacrolein or further methacrylic acid by vapor phase oxidation method.

The starting compound (A) may be used without being diluted or may be used after being diluted with an inactive substance to the reaction. If the starting compound (A) is used without being diluted, there is no need to separate inactive gas used for dilution from the product (B) and therefore it is preferable. Further, in the case of using the compound without being diluted, generally, the temperature tends to exceed a prescribed reaction temperature in a region where the heat generation quantity is high and the temperature tends to be lower than the prescribed reaction temperature in a region where the heat generation quantity is low, however the heat exchange reactor (1) of the present invention is able to adjust the temperatures of the respective regions precisely, therefore the reactor is used preferably.

The heat exchange reactor (1) of the present invention is provided with the reaction tube (2) for obtaining the product (B) by exothermic reaction while passing the starting compound (A) unidirectionally from upstream to downstream. It may be a single tube type reactor having one reaction tube (2), however the reactor is generally a multi-tube type heat exchange reactor having reaction tubes (2) in a number not lower than 2 and not higher than 100000. The reaction tube (2) may have a coil-like form, however generally a linear straight tube is used. In the case a straight tube is used as the reaction tube (2), the heat exchange reactor (1) of the present invention may be a transverse type reactor in which the reaction tube (2) is arranged horizontally, however generally the reactor (1) is a vertical type reactor in which the reaction tube (2) is arranged vertically to pass the starting material compound (A) vertically as shown in FIG. 1.

The reaction tube (2) may contain no catalyst, however generally the tube is employed after being filled with a catalyst. In general, a granular solid catalyst is used as the catalyst and practically, examples of the catalyst include an oxidation catalyst consisting of ruthenium oxide as a main component deposited on titanium oxide (preferably rutile type titanium oxide) for obtaining chlorine from hydrochloric acid and oxygen by vapor phase oxidation method; an oxidation catalyst for obtaining acrolein or further acrylic acid from propylene and oxygen ($O_2$) by vapor phase oxidation method; and an oxidation catalyst for obtaining methacrolein or further methacrylic acid from isobutylene and oxygen by vapor phase oxidation method. The catalyst may be diluted with an inactive filler which is inactive to the reaction. Further, in the case the catalyst is packed in the reaction tube (2) with being divided into a plurality of catalyst layers, an inactive layer containing the inactive filler may be formed between neighboring catalyst layers. In the case the catalyst is packed with being divided into a plurality of catalyst layers, the catalyst is generally arranged in a manner that the activity is adjusted to be higher in the downstream side. To adjust the activity, there are methods to be generally employed, such as a method of using different types of catalysts, a method of changing the deposition amount of a catalyst component, and a method of diluting a single kind of catalyst with the inactive filler it is also possible to adjust the activity by making the particle shape or particle size of the catalyst different.

The reactor shell (3) covers the surrounding of the reaction tube (2). The reaction tube (2) is, as shown in FIG. 1, fixed in the reactor shell (3) by an upper tubular plate (10) and a lower tubular plate (12).

The reactor shell (3) is divided into a plurality of regions (3) along the passing direction of the starting compound (A). The reactor shell (3) may be divided into two or more tiers and is generally into ten or lower tiers. In the case it is divided into three or more tiers, particularly four or more tiers, the heat generation quantity of the respective regions becomes relatively low and the effect of the heat exchange reactor (1) of the present invention is easily exhibited, therefore it is preferable to use.

To divide the reactor shell (3) into a plurality of regions (31, 32, ... 3n), generally, partitions (11) such as intermediate tubular plates and shutting plates may be used. The intermediate tubular plates are partitions to be installed in the reactor shell (3) while closely attached to the reaction tube (2) in a manner so that mutual transfer of heat media (C1 and C2, etc.) is prevented between the neighboring regions (31 and 32, etc.). The shutting plates are partitions (11) to be installed in the reactor shell (3) while being kept from the reaction tube (2) at a gap and allowing the heat media (C1 and C2, etc.) to transfer slightly between the neighboring regions (31 and 32, etc.). Here, n is an integer of 2 or more which indicates the number of regions.

In the case the reaction tube (2) is packed with a catalyst, the heat exchange with the heat medium tends to become insufficient in the reaction tube (2) near the partitions (11) and a local hot part so-called hot spot is easily formed and therefore, it is preferable to pack the reactor tube (2) near the partitions (11) with the catalyst together with the inactive filler to dilute the catalyst, or to pack the reactor tube (2) near the partitions (11) with only the inactive filler in place of the catalyst to form an inactive filler layer in order to suppress heat generation near here.

The heat medium (C) circulating in the respective regions (31, 32, ... 3n) is properly selected based on the aimed reaction temperature and the handling easiness of the heat medium and examples thereof include an inorganic heat medium containing inorganic substances such as fused salts (HTS: heat transfer salt), e.g., a mixture containing 40% by weight of sodium nitrite, 7% by weight of sodium nitrate and 53% by weight of potassium nitrate and a mixture containing 50% by weight of sodium nitrite and 50% by weight of potassium nitrate, and fused metals such as metal sodium; an organic heat medium containing organic substances such as alkylbiphenyls, mixtures of biphenyls and diphenyl oxides, mixtures of biphenyls and diphenyl ethers, triphenyls, dibenzyltoluenes, alkylbenzenes, alkylnaphthalenes, and aryl alkyls; ionic liquids; and water.

Baffle plates (13) may be installed in the respective regions (31, 32, ... 3n) inside the reactor shell (3) to adjust the fluidization direction of the heat media (C1, C2, ... Cn). Examples of the shape of the baffle plate include a disk, a disk with a hole, and a truncated disk. The baffle plates (13) are generally arranged so as to adjust the flow direction of the heat media approximately at right angles to the reaction tube (2). The baffle plates (13) may be installed in all of the regions (31, 32, ... 3n) or only a particular region (31) where the reaction temperature is to be controlled well as shown in FIG. 1. The number of the baffle plates to be installed in one region is generally about 1 to 3 plates.

Since the heat media (C1, C2, ... Cn) of the respective regions (31, 32, ... 3n) are generally heated by absorbing reaction heat from heat exchange with reaction tube (2), heat exchange is generally carried out while the heat media (C1, C2, ... Cn) packed in the respective regions are cooled. For example, in the case of the heat exchange reactor (1) shown in FIG. 1, circulation pumps (61 to 64) and cooling apparatuses (31 to 84) are installed for the respective regions to circulate the heat media (C1 to C4) between the respective regions (31 to 34) and the cooling apparatus (81 to 84) and thus cool the heat media (C1 to C4). The temperatures of the heat media (C1 to C4) in the respective regions may be controlled independently by, for example, a method of adjusting the circulation flow rates of the heat media (C1 to C4) by circulation flow rate control valves (U1 to U4) installed between the respective cooling apparatus (81 to 84) and the respective regions (31 to 34) or a method of adjusting the cooling temperature of the heat media (C1 to C4) in the respective cooling apparatus (81 to 84).

Figure 2:
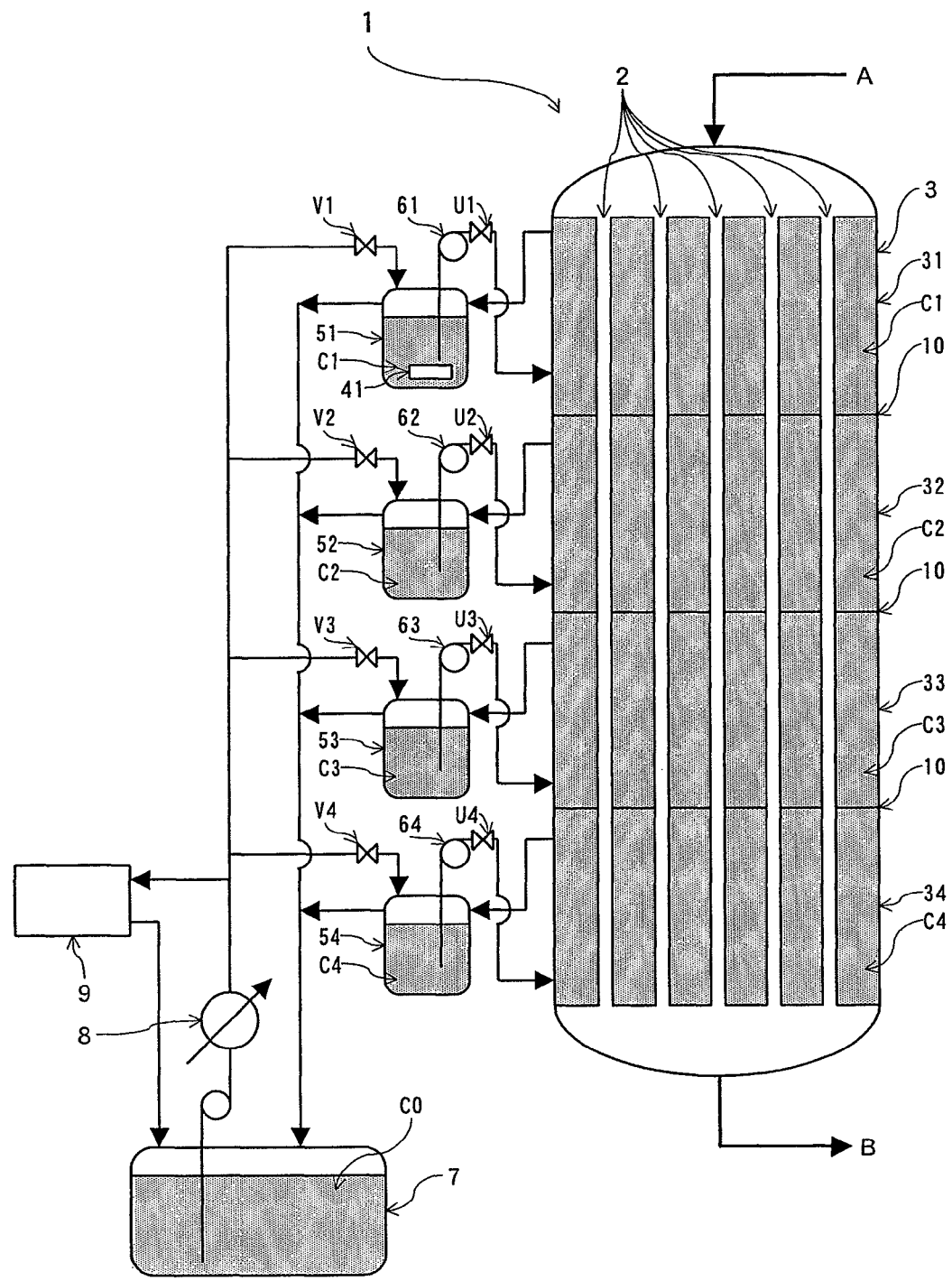
FIG. 2 is a schematic illustration showing another embodiment of a heat exchange reactor of the present invention.
Figure 3:
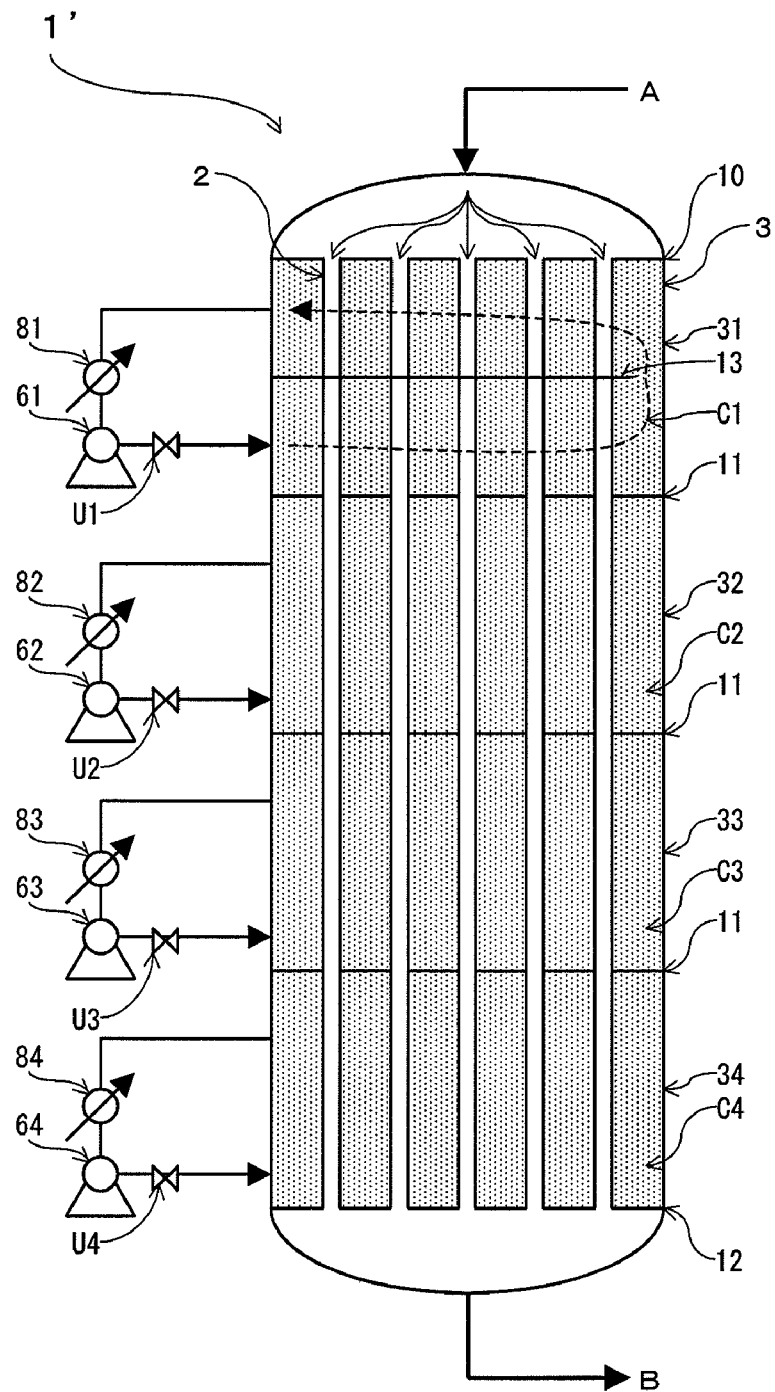
FIG. 3 is a schematic illustration showing a conventional heat exchange reactor.

In the case of the heat exchange reactor (1) shown in FIG. 2, the heat media (C1 to C4) in the respective regions are cooled by adding previously cooled heat media (C0) to the respective regions (31 to 34). That is, in this heat exchange reactor (1), circulation pumps (61 to 64) and circulation tanks (51 to 54) are installed in the respective regions (31 to 34) to respectively circulate the heat media (C1 to C4) between the respective regions (31 to 34) and circulation tanks (51 to 54) by the circulation pumps (61 to 64). At the same time, the previously cooled heat medium (C0) is distributed and added to the circulation tanks (51 to 54) from a heat medium tank (7) and accordingly, the heat media (C1 to C4) of the respective regions (31 to 34) are cooled. The temperatures of the heat media (C1 to C4) in the respective regions can be adjusted for the respective regions (31 to 34) by a method of adjusting the supply amount of the heat medium (C0) by supply flow rate control valves (V1 to V4) installed between the heat medium tank (7) and the respective circulation tanks (51 to 54).

Additionally, in the heat exchange reactor (1) shown in FIG. 2, a cooling apparatus (8) is installed to the heat medium tank (7) and the heat medium (C0) is cooled by the cooling apparatus (8). Excess heat media (C1 to C4) overflow the respective circulation tanks (51 to 54) and are sent to the heat medium tank (7). Further, each of the circulation tanks (51 to 54) is preferably installed as near as possible to the respective regions (31 to 34) since pipes between the regions and the circulation tanks can be lessened. A preheating apparatus (9) is installed in the heat medium tank (7) and at the time of starting operation, the heat medium (C0) may be previously heated to a prescribed temperature by the preheating apparatus (9) and then supplied to the respective circulation tanks (51 to 54).

In the heat exchange reactor (1) shown in FIG. 2, in the case the reactor shell (3) is divided by the shutting plates, it is preferable to keep the liquid surfaces of the heat media in the respective circulation tanks (51 to 54) coincident since the transfer of the heat media (C1 to C4) among the respective regions (31 to 34) is suppressed; and it is also preferable to adjust the circulation flow rate between the respective regions (31 to 34) and the circulation tanks (51 to 54) by circulation flow rate control valves (U1 to U4) in order to minimize the transfer of the heat media (C1 to C4) among the respective regions (31 to 34). The liquid surfaces of the heat media in the respective circulation tanks (51 to 54) can be measured by a normal liquid surface meter (not illustrated).

The circulation pumps (61 to 64) to be used in FIG. 1 and FIG. 2 may be axial flow pumps, centrifugal vortex pumps and the like and vertical centrifugal vortex pumps are especially preferably used.

The heat exchange reactor (1) of the present invention is provided with a heater (41) for heating a heat medium (C1) packed in the most upstream region (31) among the separate regions independently from heat media (C2 to Cn) of other regions (32 to 3n). An electric heater and a heat exchange heater are exemplified as the heater (41) and an electric heater is preferably employed.

In the case of the heat exchange reactor (1) shown in FIG. 1, in the middle of the pipes between the respective separate regions (31 to 34) and the cooling apparatus (81 to 84) heaters (41 to 44) for heating the heat media (C1 to C4) circulating between them are installed. Accordingly, the heat media (C1 to C4) in all regions can be heated independently from heat media of other regions.

In the case of the heat exchange reactor (1) shown in FIG. 2, the heater (41) for heating the heat medium (C1) in the circulation tank (51) is installed in one tank (51) among the circulation tanks (51 to 54) installed in the respective regions (31 to 34). Accordingly, the heat medium (C1) of the region (31) where the circulation tank (51) is installed can be heated independently from heat media (C2 to C4) of other regions (32 to 34).

As shown in FIG. 1, it is preferable to install the heaters in all of the separate regions (31 to 34) since the temperatures of the respective regions (31 to 34) can be adjusted more precisely, however in some cases, a heater (41) may be installed in only one region (31) as shown in FIG. 2.

In the heat exchange reactor (1) of the present invention, since the heat medium (C1) of the most upstream region (31) among the separate regions can be heated independently from the heat media (C2 to Cn) of other regions (32 to 3n), it is made easy to precisely adjust the temperatures of the respective regions in entire body of the reaction tube (2) and in the case, for example, when the supply amount of the starting compound (A) is small and heat generation quantity by exothermic reaction is small, the entire body of the reaction tube (2) can be easily kept at a prescribed reaction temperature.

Further, in the case, for example, when the starting compound (A) is supplied to the reaction tube (2) without being sufficiently pre-heated, the brought out quantity of sensible heat exceeds the heat generation quantity in the most upstream separate region and the reaction temperature may not be kept at the vicinity of the inlet of the reaction tube (2), however, as shown in FIG. 1 and FIG. 2, in the case the heater (41) for heating the heat medium (C1) of the region (31) near the inlet of the reaction tube (2) is installed, since the heat medium (C1) of the region (31) can be heated alone without heating the heat media (C2 to C4) of other regions (32 to 34), it is made easy to keep the region (31) at the prescribed reaction temperature while keeping the other regions (32 to 34) at the prescribed reaction temperature.

In the case a catalyst is packed in the reaction tube (2), the catalyst in the vicinity of the inlet (31) tends to be deteriorated relatively quickly, whereas the catalyst in the vicinity of the outlet (34) tends to be deteriorated relatively slowly, and if the catalyst in the region (31) corresponding to the vicinity of the inlet is deteriorated and the yield in the region (31) is therefore lowered, the reaction temperature is increased by heating the heat medium (C4) in the region (34) corresponding to the vicinity of the outlet and the yield of the region (34) can be increased.

Further, in the case it is required to previously set the respective regions (31 to 3n) at different temperatures before introducing reaction gas, the heaters (41 to 4n) of the respective regions may be independently used to set the temperatures as shown in FIG. 1. Of course, heaters similar to the heater (41) installed in the circulation tank (51) of the most upstream region in FIG. 2 may be installed in all regions.

INDUSTRIAL APPLICABILITY

According to the present invention, it is provided a heat exchange reactor in which the most upstream region can be kept at a prescribed reaction temperature even if the supply amount of a starting compound (A) is small, and further a heat exchange reactor in which the entire regions can be easily kept at prescribed reaction temperatures. Further, a reaction method of the starting compound (A) and a process for production of a product (B) capable of suppressing decrease of reaction yield are provided. According to the present invention, even in the case it is required to set the respective regions (31 to 34) at different temperatures before introducing reaction gas, it is made easy to satisfy the requirement.

The invention claimed is:

1. A heat exchange reactor comprising a reaction tube for obtaining a product (B) by exothermic reaction while passing a starting compound (A) therethrough and a reactor shell covering the surrounding of the reaction tube and having its interior divided into a plurality of regions along the passing direction of the starting compound (A), each of which regions filled with a heat medium for carrying out heat exchange between the inside of the reaction tube and the heat medium independently for the respective separate regions, wherein all of the separate regions are respectively provided with heaters for heating the respectively charged heat media independently from the heat media charged in other regions, and wherein circulation pumps and cooling apparatuses are installed for the respective regions to circulate the heat media between the respective regions and the cooling apparatuses and thus cool the heat media.

2. A reaction method of the starting compound (A) by supplying and passing the starting compound (A) to and through the reaction tube of the heat exchange reactor according to claim 1 and carrying out exothermic reaction, wherein the heat exchange is carried out while the heat media charged in the respective regions are cooled by adding a previously cooled heat medium to the respective separate regions.

3. A process for producing chlorine by supplying and passing hydrochloric acid and oxygen to and through the reaction tube of the heat exchange reactor according to claim 1 and carrying out exothermic reaction, wherein the heat exchange is carried out while the heat media charged in the respective regions are cooled by adding a previously cooled heat medium to the respective separate regions.

4. A process for producing chlorine according to claim 3, wherein the hydrochloric acid and oxygen are supplied and passed without dilution to and through the reaction tube of the heat exchange reactor.

5. The process for producing chlorine according to claim 3 using an oxidation catalyst containing ruthenium oxide as a main component deposited on titanium oxide.

6. The process for producing chlorine according to claim 4 using an oxidation catalyst containing ruthenium oxide as a main component deposited on titanium oxide.

* * * * *